United States Patent [19]
Liencres et al.

[11] Patent Number: 5,434,993
[45] Date of Patent: Jul. 18, 1995

[54] METHODS & APPARATUS FOR CREATING A PENDING WRITE-BACK CONTROLLER FOR A CACHE CONTROLLER ON A PACKET SWITCHED MEMORY BUS EMPLOYING DUAL DIRECTORIES

[75] Inventors: Bjorn Liencres, Palo Alto; Douglas Lee, San Francisco; Pradeep S. Sindhu, Mountain View; Tung Pham, San Jose, all of Calif.

[73] Assignees: Sun Microsystems, Inc., Mountain View, Calif.; Xerox Corporation, Stamford, Conn.

[21] Appl. No.: 973,309

[22] Filed: Nov. 9, 1992

[51] Int. Cl.[6] .............................................. G06F 12/08
[52] U.S. Cl. ............................ 395/425; 364/DIG. 1; 364/DIG. 2; 364/243.44; 364/228.1
[58] Field of Search ... 364/200 MS File, 900 MS File; 395/425

[56] References Cited

U.S. PATENT DOCUMENTS

| | | | |
|---|---|---|---|
| 5,247,648 | 9/1993 | Watkins et al. | 395/425 |
| 5,263,144 | 11/1993 | Zurawski et al. | 395/425 |
| 5,265,233 | 11/1993 | Frailong et al. | 395/425 |
| 5,265,235 | 11/1993 | Sindhu et al. | 395/425 |
| 5,303,362 | 4/1994 | Butts, Jr. et al. | 395/425 |
| 5,313,609 | 5/1994 | Baylor et al. | 395/425 |
| 5,325,504 | 6/1994 | Tipley et al. | 395/425 |
| 5,347,648 | 9/1994 | Stamm et al. | 395/575 |
| 5,353,424 | 10/1994 | Partovi et al. | 395/425 |
| 5,355,471 | 10/1994 | Weight | 395/575 |

FOREIGN PATENT DOCUMENTS

0468831A2  1/1992  European Pat. Off. .
WO90/05953  5/1990  WIPO .

OTHER PUBLICATIONS

IBM Technical Disclosure Bulletin, vol. 32, No. 4B, Published Sep. 1989, in Armonk, N.Y., USA, Entitled: Improved Data Cache Reload Performance, pp. 244-245.

Compcon 88, Thirty-Third IEEE Computer Society International Conference, Digest of Papers, Feb. 1988, in San Fracisco, Calif., USA, Entitled: The NS32605 Cache Controller, pp. 218-222.

*Primary Examiner*—Rebecca L. Rudolph
*Assistant Examiner*—Matthew M. Kim
*Attorney, Agent, or Firm*—Blakely Sokoloff Taylor & Zafman

[57] ABSTRACT

A write-back cache control system having a pending write-back cache controller in a multiprocessor cache memory structure. The processor subsystems in the multiprocessor system are coupled together using a high-speed synchronous packet switching bus called a memory bus. Each processor subsystem has an associated cache control system. When a processor's cache control system does not have a required memory location in the cache memory, it broadcasts a memory request packet across the memory bus for the required data. If an owned cache line is being replaced, the cache control system copies the old cache line data to the pending write-back cache controller which is responsible for the write-backs of owned cache lines to main memory. The cache control system then transfers ownership of the old replaced cache line to the pending write-back controller. When the cache control system receives the new cache line information from the memory bus, it immediately replaces the cache line and allows the processing to continue. By buffering the old cache line in the pending write-back controller, the cache control system allows the new cache line to be requested before the old cache line is written back to main memory thereby reducing the cache line replacement latency period.

17 Claims, 13 Drawing Sheets

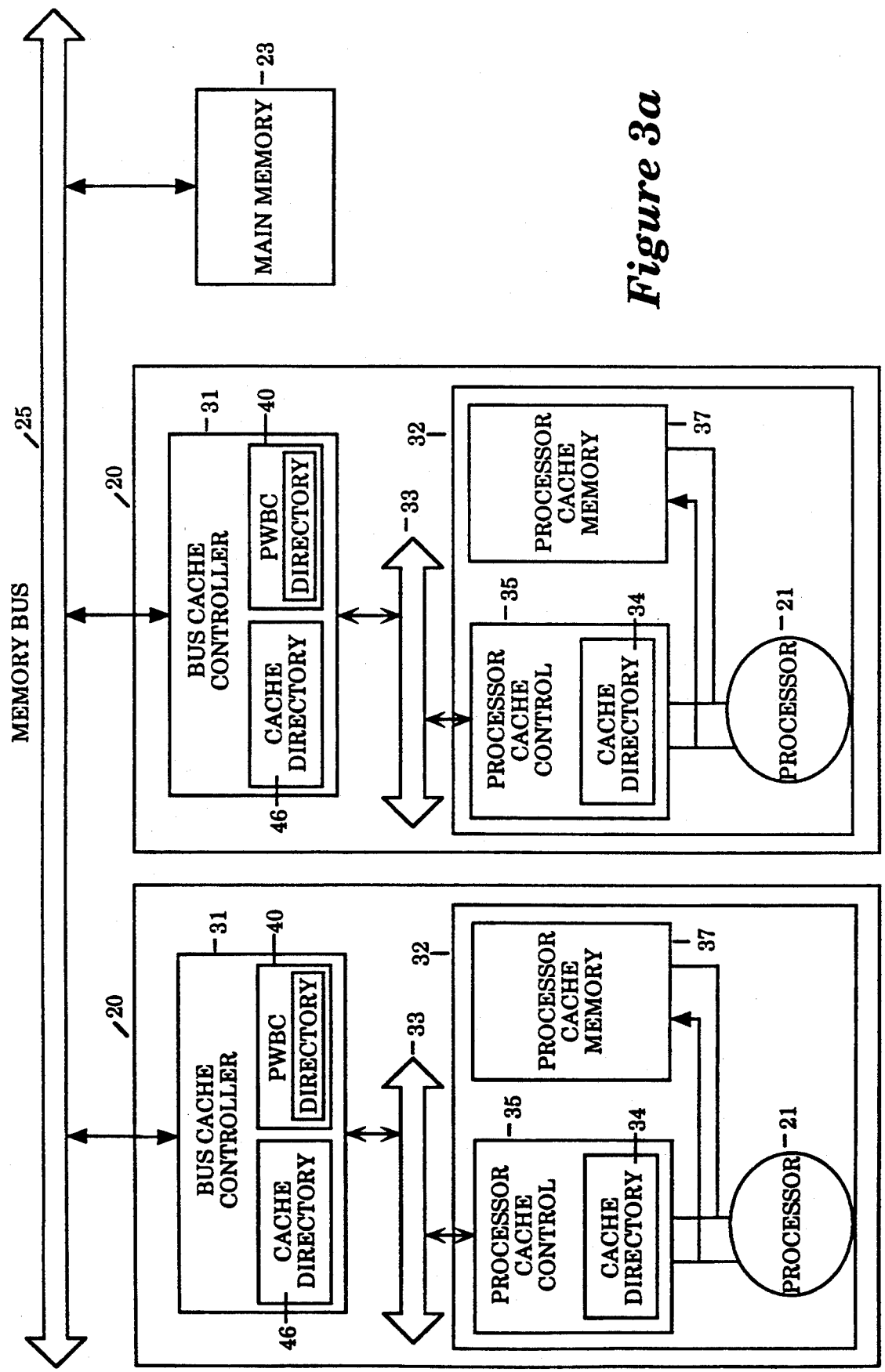

METHODS & APPARATUS FOR CREATING A PENDING WRITE-BACK CONTROLLER FOR A CACHE CONTROLLER ON A PACKET SWITCHED MEMORY BUS EMPLOYING DUAL DIRECTORIES

BACKGROUND OF THE INVENTION

1. Field of the Invention

The present invention relates to the field of cache memory structures for multiprocessor computer systems. More particularly, the present invention relates to a pending write-back cache controller in a cache control system for a multiprocessor computer system using a packet switched bus.

2. Art Background

In a typical computer system, the processing unit operates at a substantially faster speed than the main memory. When the processing unit executes instructions faster than memory can supply them, the processing unit must remain idle while it waits for the memory to retrieve the next instruction. Processing unit idle time adversely affects system performance. To avoid unnecessary processing unit idle time while awaiting data or instructions from the main memory, a cache memory capable of operating at a higher speed than a main memory is often used to buffer the data and the instructions between the main memory and the processing unit. The cache memory is typically much smaller than the main memory.

The data and instructions from the main memory are mapped into the cache memory in uniform units referred to as cache lines. Each cache line represents an aligned continuous segment of main memory. Since the cache memory is usually much smaller than the main memory, it can store only a limited subset of the main memory. Therefore the cache memory needs to store a portion of the data's main memory address. This portion of the address is called the address tag, and there is one address tag per cache line. Each cache line may be further subdivided into smaller uniform increments referred to as subblocks. Access to a cache line in the cache memory is typically made using a cache directory which stores the address tags and a set of status bits associated with the cache line.

Recently, computer systems having multiple processors have become common, directed to increasing processing speed. In a multiprocessor system, each of the processor subsystems may have its own individual cache memory. In order for a multiprocessor system with individual cache memories to operate properly, the system must maintain proper correspondence of the data stored in the cache memories since each processor may alter the data stored in its local cache memory. Correspondence of the data in the various caches is termed "cache consistency". A cache system is deemed "consistent" when the value returned from a "load from memory" operation is always the same value of the latest "store to memory" operation to the same memory address.

To maintain cache consistency, several status bits are usually maintained in the cache directory which reflects the current state of the information in each cache line. Common status bits maintained include a "valid" bit, a "shared" bit, and an "owned" bit. A "valid" bit reflects whether the information stored in the cache line is currently valid. A "shared" status bit indicates whether the information in the cache line is shared by other cache memories. If a cache line is "shared" it cannot be modified without first invalidating the cache line in the other cache memories or updating the cache line in the other cache memories. An "owned" status bit indicates that the information in the cache line has been modified without being written back to the main memory. A line of memory can be "owned" by only one processor subsystem at a time. If a processor needs to modify the contents of one of its cache lines, the processor must first change the status of cache line to make it "owned". Owned cache lines must be written back to main memory before they are replaced with new information.

An example of a multiprocessor system maintaining cache consistency is illustrated in FIGS. 1a through 1d. In FIG. 1a, the main memory unit has an address A that contains a value of 1. Processors 2 and 3 perform load A operations to obtain the value of A. During each processors load operation, the value of A is stored in the processor's local cache memory. Processors 2 and 3 now "share" memory location A and both caches have "valid" data. In FIG. 1b, Processor 1 has written a value of 2 to location A. This is permitted since neither processor 2 or processor 3 "owned" memory location A. In order to change the contents of memory location A, Processor 1 broadcasts a message across the memory bus informing other memory devices that the contents of memory location A has changed. This message causes the cache memories of processor 2 and 3 to change the status of memory location A to "invalid". The main memory unit does not maintain a set of status bits for each memory line. Instead, the main memory monitors a control line on the memory bus that is asserted whenever a request is made for a memory line that is "owned" by a processor subsystem. When the "owned" control line is asserted, the main memory learns that the line is owned by some processor subsystem and therefore does not respond to the request. Cache memory 1 now "owns" location A since it modified the contents of memory location A without updating the main memory. In FIG. 1c, processor 1 has changed the contents of memory location A to the value of 3. Since processor 1 does not share memory location A with any other processor, Processor 1 does not need to send a message across the memory bus. However, in FIG. 1d, processor 3 requires the value of memory location A for a load operation. Processor 3 must therefore send a request across the bus requesting the value of memory location A. Since processor 1 "owns" memory location A, it must respond to the request with a reply containing contents of memory location A. Memory location A is now represented in the cache memories of processors 1 and 3. Although memory location A is still "owned" by processor 1, it must now "share" memory location A with processor 3. Therefore, any further changes to memory location A by processor 1 must be forwarded to processor 3. Processor 1 must eventually write-back the changed contents of memory location A to main memory.

In computer systems implementing a cache memory system, the cache memory is first searched when a processor requests data from a memory address. A cache controller examines the address tags in the cache directory for the requested memory address. If an address tag in the cache directory matches the memory address needed and the cache line is valid, there is a cache "hit" and the data is transferred from the cache memory to the processor. If the processor subsequently modifies the data stored in a cache line, the cache line becomes a "owned" cache line. As illustrated above, the modified or "owned" cache line must eventually be written back to the main memory. If the cache controller always updates the main memory immediately after a cache line is modified, the system is referred to as a "write-through" cache. It is called a "write-through" cache since the cache system always writes through the cache memory and into the main memory.

On the other hand, when a processor makes a read request for data from a memory address and none of the address tags in the cache directory match the requested memory address or an address match occurs but the cache line is invalid, a cache "miss" occurs. The cache controller must therefore retrieve the data from the main memory or from another processor's cache memory which owns the data. During the retrieval of the memory line, the processing unit usually must remain idle until the retrieval is completed.

When a cache controller retrieves a line of data from the main memory or from another processor's cache memory for the local processor, the line is placed into the local cache memory. If no empty cache line is available, the cache must replace one of the currently used cache lines. The cache line chosen to be replaced is typically referred to as the displaced or victim line. If the cache system is a "write-through" cache system replaces the victim line immediately. The victim line in a "write-through" cache system can be immediately replaced since the main memory already has the contents as the victim line. However, if the processor modified the contents of the cache line (an "owned" cache line), the cache controller must first write-back the contents of the cache line to main memory before the cache line can be replaced. Cache systems which only write-back the contents of an owned cache line when the cache line needs to be replaced are referred to as "write-back" caches. "Write-back" cache systems update main memory less frequently than "write-through" systems since consecutive writes by the processor to the same owned cache line will not result in multiple writes to main memory. Since "write-back" cache systems update the main memory less frequently, they are more efficient than "write-through" cache systems.

FIG. 2 illustrates a prior art multiprocessor system with individual write-back cache memories for each processor subsystem. The multiprocessor system of FIG. 2 maintains cache consistency by using a set of cache directories 28 located in each cache controller 29. The cache directories 28 contains the tag addresses for each cache line and the status bits which specify if a cache line is valid (contains valid data), owned (modified and not written back to main memory yet), and/or shared (represented in another processor's cache memory).

When a processor in the multiprocessor system of FIG. 2 needs to read information not currently stored in the local cache memory, it must often replace a currently used cache line. If the cache line to be replaced is "owned", the contents of the cache line must be written back to main memory 23. In a typical write-back cache memory system, the cache controller 29 first writes-back the "owned" cache line to main memory 23 and after the write-back is completed, it requests the new line of data from main memory 23. Although requesting the new cache line only after writing back the owned cache line results in a simple design, this method creates a long latency period while the owned cache line is written back and the new cache line is obtained. During this latency period, the processor 21 usually remains idle while it waits for the needed data. Consequently, this long latency period required for cache line replacement degrades the efficiency of the multiprocessor computer system. This is especially true in large cache memories 37 where cache lines tend to be long and several owned subblocks may need to be written to memory before the new desired cache line data is requested.

SUMMARY OF THE INVENTION

Apparatus and methods for implementing a dual directory cache control system having a pending write-back cache controller in a cache memory structure supporting multiple processing units are disclosed. The processing units in the multiprocessor system are coupled together using a high-speed synchronous packet switching bus called a memory bus. Each processing unit has an associated write-back cache control system. Each write-back cache control system is divided into two separate cache controllers: the bus cache controller and the processor cache controller. The bus cache controller and the processor cache controller are coupled to one another over a second high-speed synchronous packet switching bus called a cache bus. The bus cache controller and the processor cache controller each maintain a separate directory containing tag addresses and status bits.

The processor cache controller is closely coupled to the actual processing unit. The processor cache controller services memory requests made by the processing unit. When the processor cache controller does not have a required memory location in the cache memory, it sends a request across the cache bus to the bus cache controller. If a cache line must be replaced, the processor cache controller then immediately proceeds to send the owned subblocks from the cache line that will be replaced to the bus cache controller.

The bus cache controller is connected directly to the memory bus and handles all the memory bus transactions for the processing unit. The bus cache controller contains a pending write-back controller which is responsible for handling the write-backs of owned cache lines to main memory. When the bus cache controller receives a memory request from the processor cache controller caused by a cache miss, it quickly broadcasts a corresponding memory request packet on the memory bus. If an owned cache line is to be replaced, the processor cache controller sends the subblocks from the owned cache line to the bus cache controller which buffers the owned subblocks in the pending write-back controller. When the bus cache controller receives the new cache line information from the memory bus, it immediately sends the new cache line information to the processor cache controller which replaces the cache line and allows the processing to continue. By buffering the owned cache line, the pending write-back controller allows the new cache line to be requested and replaced before the owned cache line is written back to main memory. This allows the cache miss latency period to be reduced substantially on the average.

The pending write-back controller in the bus cache controller acts as an intelligent write-back buffer for the bus cache controller. Once the bus cache controller has sent out a read request for new cache line data, the old cache line data from the owned cache line is given to the pending write-back controller to be written back to main memory. While the pending write-back controller is in control of an owned cache line which has not been written back yet, it must respond to read requests directed to that cache line. If another device on the memory bus performs a write to a cache line owned by the pending write-back controller, the pending write-back controller must not perform the write-back since it contains stale data.

BRIEF DESCRIPTION OF THE DRAWINGS

The present invention will be understood more fully from the detailed description given below and from the accompanying drawings of the preferred embodiment of the invention in which:

FIG. 3a is a block diagram of a multiprocessor system with the cache control system of the present invention where the cache controller is divided into a processor cache controller and a bus cache controller.

DETAILED DESCRIPTION OF THE INVENTION

Figure 1A:
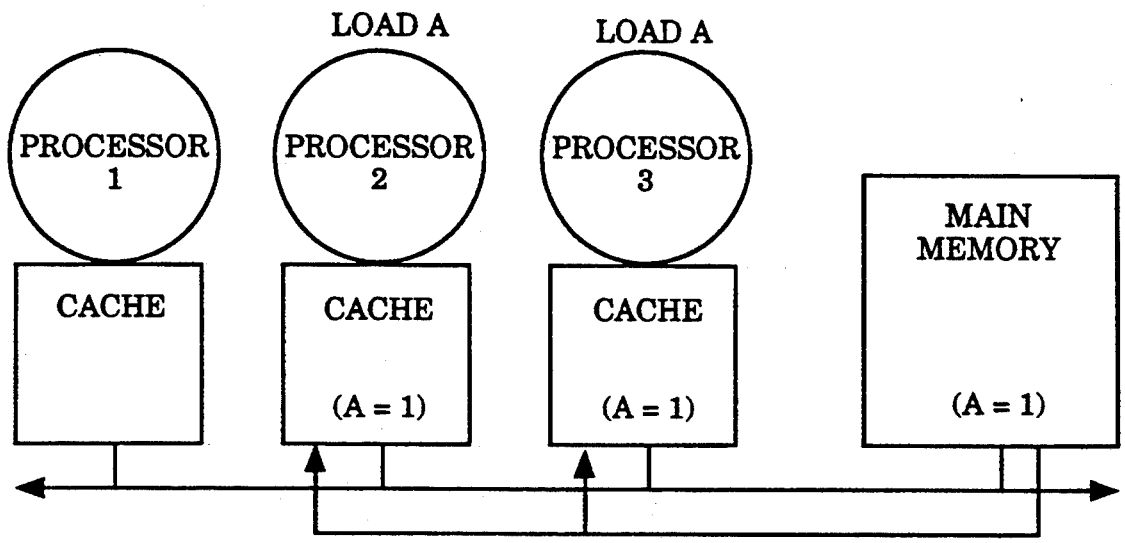
FIGS. 1a-1d provide an illustration of maintaining cache consistency in a multiprocessor system where each processor subsystem has its own cache memory.
Figure 1B:
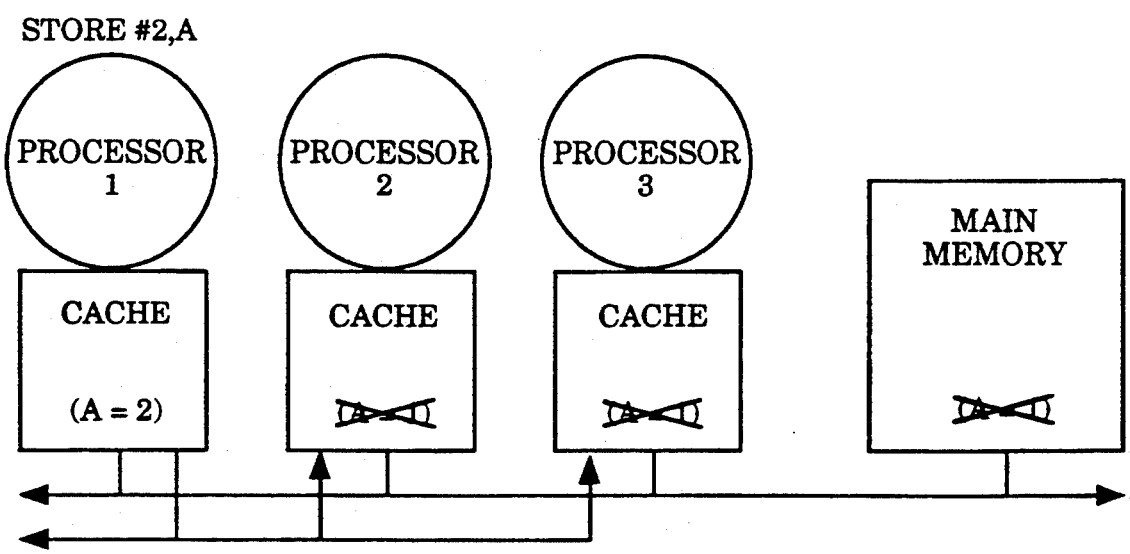
Figure 1C:
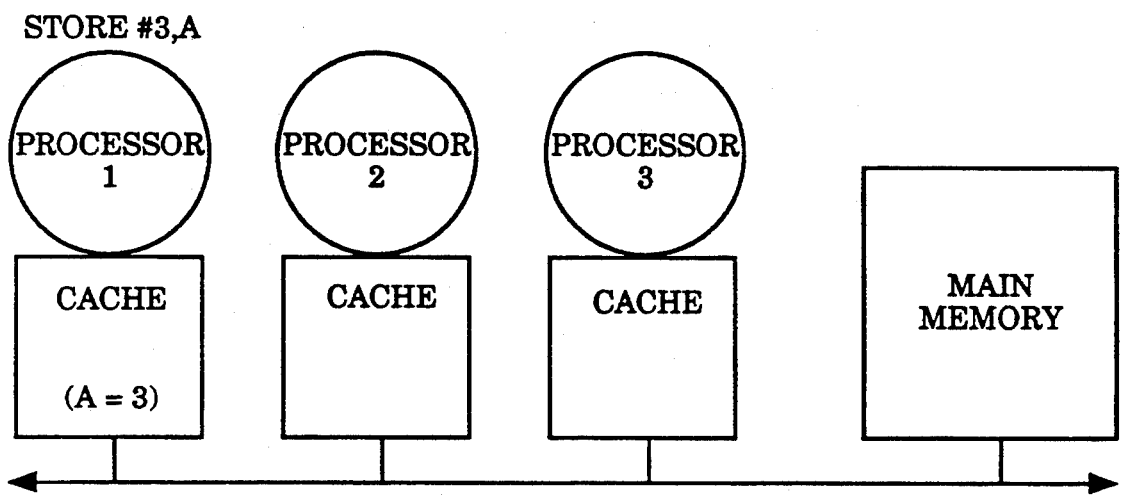
Figure 1D:
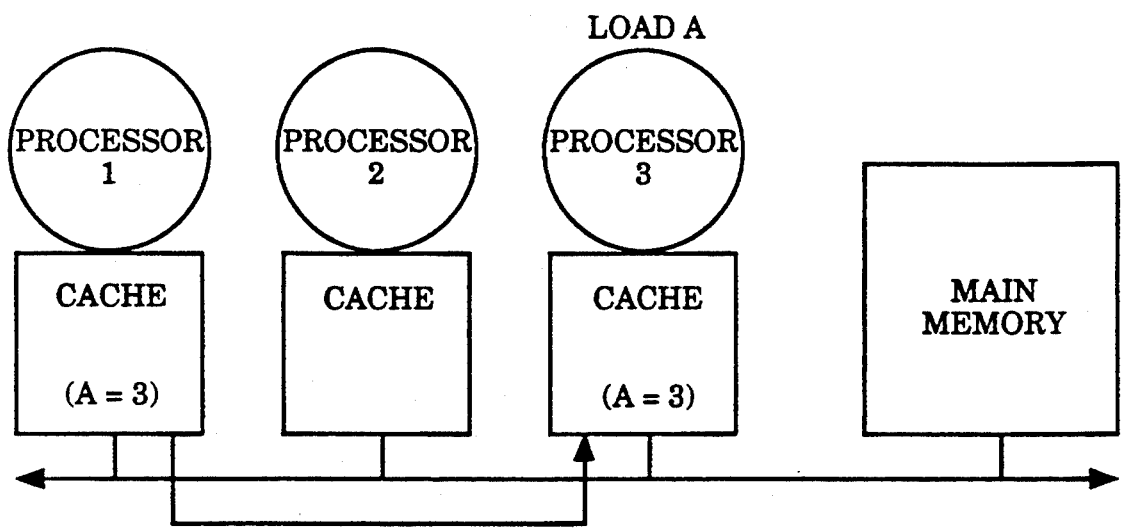
Figure 2:
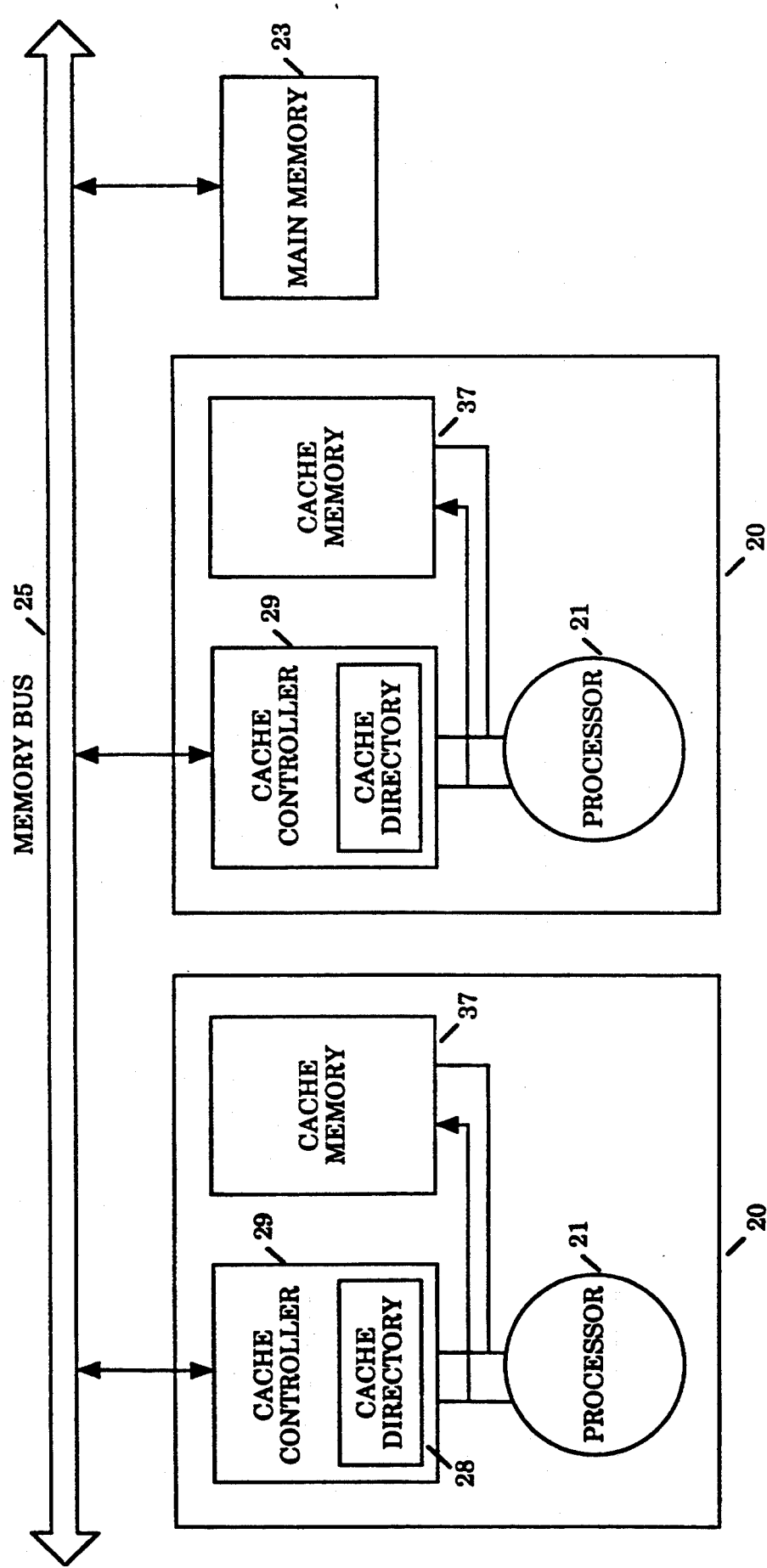
FIG. 2 is a block diagram of a multiprocessor system with prior art write-back cache memory systems for each processor subsystem.

Apparatus and methods for implementing a dual directory cache control system having a pending write-back cache controller are disclosed. In the following description, for purposes of explanation, specific numbers, times, signals etc., are set forth in order to provide a thorough understanding of the present invention. However, it will be apparent to one skilled in the art that the present invention may be practiced without these specific details. In other instances, well known circuits and devices are shown in block diagram form in order not to obscure the present invention unnecessarily.

Reference is now made to FIG. 3a which depicts a block diagram overview of a multiple processor high performance computer system incorporating the teachings of the present invention. In FIG. 3a, a main memory unit 23 is shown coupled to a memory bus 25. Although only one main memory unit is illustrated in FIG. 3a, the main memory address space may broken into several distinct memory units. Therefore it is possible to have more than one memory unit connected to memory bus 25. Also shown coupled to the memory bus 25 are a pair of processor subsystems 20. The processor subsystems 20 read data from and write data to the main memory 23 over the memory bus 25. More than two processor subsystems 20 can be coupled to the memory bus 25 to provide additional processing power.

The memory bus 25 of FIG. 3a is a high speed synchronous packet switching bus used to transfer data between a plurality of devices on the memory bus 25. Details for implementing a packet-switched memory bus are given in the U.S. patent application Ser. No. 08/188,660, filed Jan. 30, 1994, which is a continuation of U.S. patent application Ser. No. 07/620,508, filed Nov. 30, 1990, entitled "Consistent Packet Switched Memory Bus For Shared Memory Multiprocessors" which is hereby incorporated by reference. Most transactions on the memory bus 25 consists of a request packet sent by a first device followed an arbitrary time period later by a reply packet sent by a second device. For example, a processor subsystem 20 on the memory bus 25 may send a read request packet requesting a subblock of memory. The main memory 23 (or another processor subsystem 20 that "owns" the subblock) would then reply back to the requesting processor subsystem with a read reply packet containing the requested memory subblock. A few memory bus 25 transactions consist only of a request packet, such as a write request, with no corresponding reply packet.

The processor subsystems 20 of FIG. 3a are comprised of a bus cache controller 31, a cache bus 33, and a processor module 32. The processor module 32 performs the actual processing. The bus cache controller 31 performs all the required memory bus 25 transactions for the associated processor module 32. The bus cache controller 31 and the processor module 32 communicate with one another over a high speed synchronous packet switching bus referred to as the cache bus 33. The cache bus 33 is similar to the memory bus 25 in that each transaction consists of a request packet followed an arbitrary time period later by a reply packet.

Figure 3B:
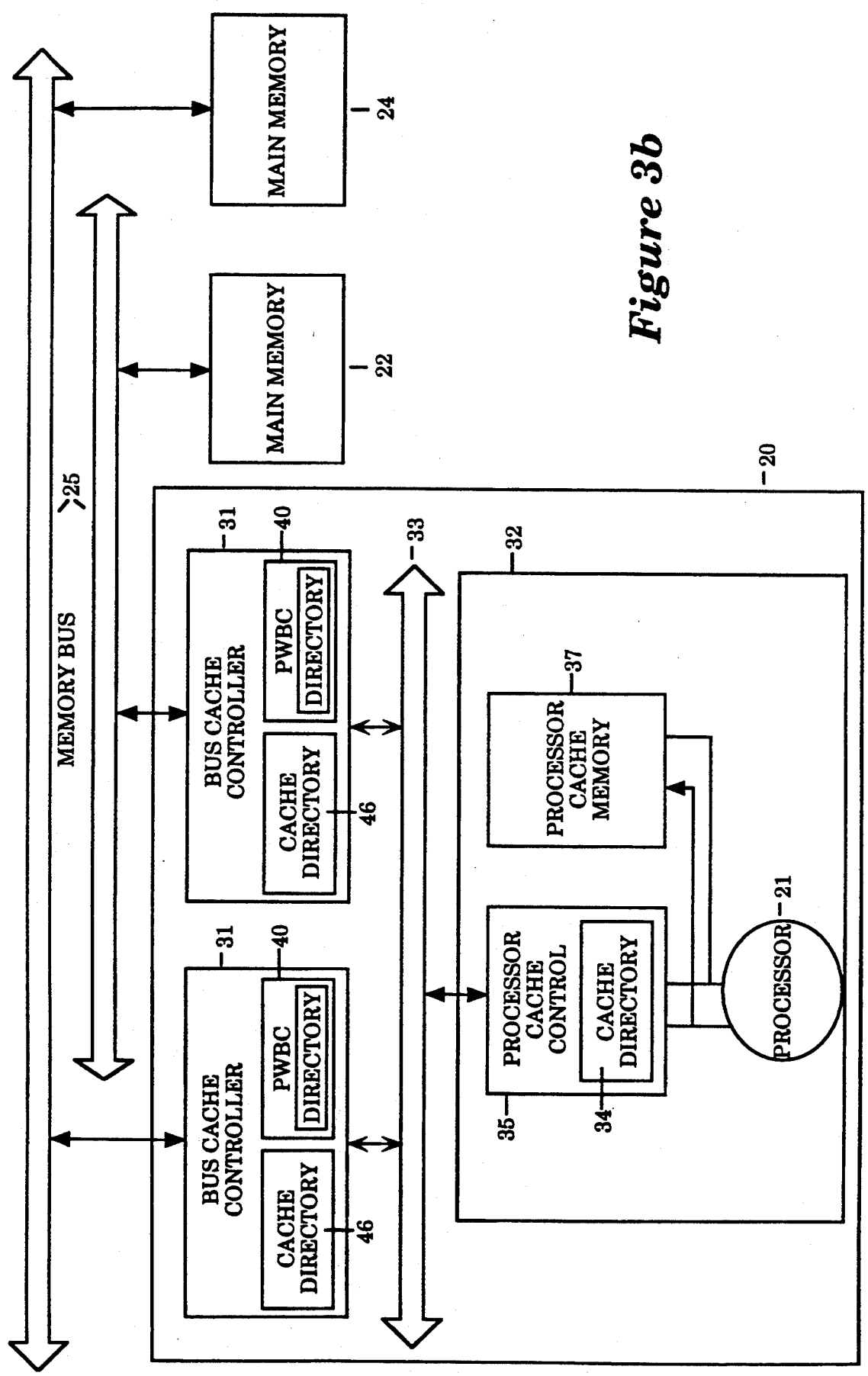
FIG. 3b is a block diagram of an alternate embodiment of the cache memory system of the present invention where the multiprocessor system has multiple memory buses.

The cache bus 33 can be used by the processor module 32 to support multiple bus cache controllers coupled to separate memory buses. Referring to FIG. 3b, an alternate embodiment of the present invention with two memory buses is illustrated. In the embodiment of FIG. 3b, a processor module 32 is coupled to a cache bus 33 which has two separate bus cache controllers 30 and 31. Each bus cache controller 30 and 31 controls bus transactions on a separate memory bus. The separate memory buses each have their own associated main memory units 22 and 24.

Referring back to FIG. 3a, the processor module 32 contains a processor 21, a processor cache controller 35, and a cache memory 37. The processor cache controller 35 maintains a processor cache directory 34 containing address tags and status bits for the cache lines stored in the processor cache memory 37. The processor cache controller 35 is responsible for acting as an interface between the processor cache memory 37 and the processor 21.

The bus cache controller 31 performs a number of cache control operations for the processor subsystem 20. The main purpose of the bus cache controller 31 is to perform all the required memory bus 25 transactions for the processor subsystem 20. The bus cache controller 31 maintains a cache directory 46 containing the address tags and status bits for the data in the cache memory 37. The bus cache controller 31 includes a pending write-back controller 40 which is responsible for writing back owned cache lines which have been replaced with new information as will be explained later. The functionality of the bus cache controller 31 is best explained with reference to the transactions it manages on the memory bus 25. The bus cache controller 31 performs three types of bus transactions on the memory bus 25: reads, writes, and write-backs. Each transaction type will be addressed separately.

Read Transactions

When a memory request by the processor 21 cannot by fulfilled by the data in the processor cache memory 37, the processor cache controller 35 sends a read request packet across the cache bus 33 to the bus cache controller 31. The bus cache controller 31 proceeds to broadcast a corresponding read request packet across the memory bus 25. The read transaction initiated by the bus cache controller 31 consists of two packets: a read request packet sent by the bus cache controller 31 on the memory bus 25 and a read reply packet sent by another device on the memory bus. The read request packet contains the address of the memory requested by the processor cache controller 35 and is broadcast to all entities on the memory bus 25. A device on the memory bus 25 that contains the requested memory address responds to the read request packet with a read reply packet containing the subblock which includes the requested memory address. The read reply packet is generally issued by the main memory 23 except when the desired memory address is "owned" by another processor subsystem 20. In that case, the processor subsystem that owns the subblock must generate a read reply packet with the requested data.

Write Transactions

When a the cache memory system for a processor subsystem "owns" a particular cache line, it is allowed to modify the contents of the cache line. If the processor 21 modifies a cache line which is shared with other cache memories, the bus cache controller 31 performs a write transaction to update the information in the cache memories that share the cache line. If the cache line is subdivided into subblocks, not all modifications to data in a cache line result in a write transaction. In a system with subblocks it is only necessary to broadcast those subblocks which have been modified and reside in other caches as well. "Shared" flags are required for each subblock to keep this information, but will not be discussed here. The disclosure of U.S. patent application Ser. No. 07/620,496, filed Nov. 30, 1990, entitled "Consistency Protocols For Shared Memory Multiprocessors", now U.S. Pat. No. 5,265,235, issued Nov. 23, 1993, are incorporated by reference.

Write-Back Transactions

Write-back transactions are issued by the bus cache controller 31 when updating main memory 23 with owned subblocks from cache lines that are no longer needed by the processor 21. Write-back transactions on the memory bus 25 are directed to the main memory 23 and are ignored by the other processor subsystems on the memory bus.

To completely explain the write-back transaction, it is best to explain step-by-step the events that take place when there is a cache miss and no empty cache lines are available. In such a case there is both a write-back transaction which gets rid of the old information in the cache line, and a read transaction which obtains the new information for the new cache line.

Referring to FIG. 3a, when the processor 21 requires data that is not stored in the local cache memory 37, a cache miss occurs. The processor cache controller 35 issues a read request packet containing the required memory address to the bus cache controller 31 through the cache bus 33. As discussed in the read transaction section, the bus cache controller 31 responds to the read request packet by broadcasting a corresponding read request packet across the memory bus 25. The appropriate memory unit or processor subsystem on the memory bus 25 should eventually respond to the read request packet with a read reply packet containing the requested data. After issuing the read request packet for the new information, the bus cache controller 31 gives the pending write-back controller 40 the responsibility of writing back the old owned subblocks from the cache line being replaced. The pending write-back controller 40 acts as an intelligent buffer which handles all read requests for the old cache line data until it is written back to main memory 23.

After the processor cache controller 35 has sent the read request packet to the bus cache controller 31, and independently of whether or not the bus cache controller 31 issued the read request packet, the processor cache controller 35 begins to send the bus cache controller 31 any owned subblocks in the cache line which will be replaced by the new information. The bus cache controller 31 directs these owned subblocks to the pending write-back controller 40 which stores them into a data RAM. After the processor cache controller 35 has sent all the owned subblocks to the pending write-back controller 40, the processor cache controller 35 marks the cache line as invalid and is ready to accept the new cache line data.

After the pending write-back controller 40 has received all the owned subblocks from the processor cache controller 35 and the bus cache controller 31 has issued a read request for the desired data, the pending write-back controller 40 begins sending write-back packets containing owned subblocks to main memory 23. The write-backs to main memory 23 occur and independently of whether the bus cache controller has received a read reply packet.

While these transactions are in progress, other processor subsystems may issue write transactions to the subblocks being written back to main memory 23. Similarly, other processors may issues read requests to these same subblocks. In order to maintain cache consistency, the following rules must be adhered to by the pending write-back controller 40:

1. If another processor subsystem issues a write transaction to an address corresponding to an owned subblock before the subblock is written back to main memory by the pending write-back controller 40, the write-back must not occur since the pending write-back controller 40 contains "stale" data.

2. If another processor subsystem issues a read request packet to an address corresponding to a subblock owned by the pending write-back controller 40 before the subblock is written back to main memory, or before another processor issues a write transaction to an address corresponding to the same subblock, then the pending write-back controller 40 must reply with a read reply packet.

It can be seen from FIG. 3a that the write-back cache system of the present invention maintains three separate cache directories: the processor cache directory 34, the bus cache controller directory 46, and a small directory in the pending write-back controller.

The processor cache directory 34 and the bus cache controller directory 46 store the address tags and status bits for the information in the cache memory 37. The address tags and status bits in the processor cache directory 34 and the bus cache controller directory 46 usually match. However, the address tag and status bits for a given cache line in the processor cache directory 34 and the bus cache controller directory 46 may not correlate at all times. For example the processor cache controller 35 may have written back a subblock from a cache line to the bus cache controller 31 so the processor cache controller 35 no longer "owns" the subblock, but the bus cache controller 31 does still own the subblock. When the bus cache controller 31 issues a request for the new information and transfers control of the old subblocks to the pending write-back controller 40, the bus cache controller directory 46 again matches the processor cache directory 34.

The pending write-back controller 40 maintains a small directory of the owned subblocks it is buffering until they are written back to main memory 23. Each of the subblocks stored in the pending write-back controller 40 can be in one of 3 states: valid, owned, and invalid. The pending write-back controller 40 uses its directory to implement the two rules given above. If another processor subsystem executes a write to one of the owned subblocks in the pending write-back controller, it changes the status of that subblock to not owned since the data in the pending write-back controller is now stale. When the pending write-back controller 40 receives a read request packet from another processor subsystem for an owned subblock, the pending write-back controller 40 responds with a read reply packet containing the requested information.

Figure 4:
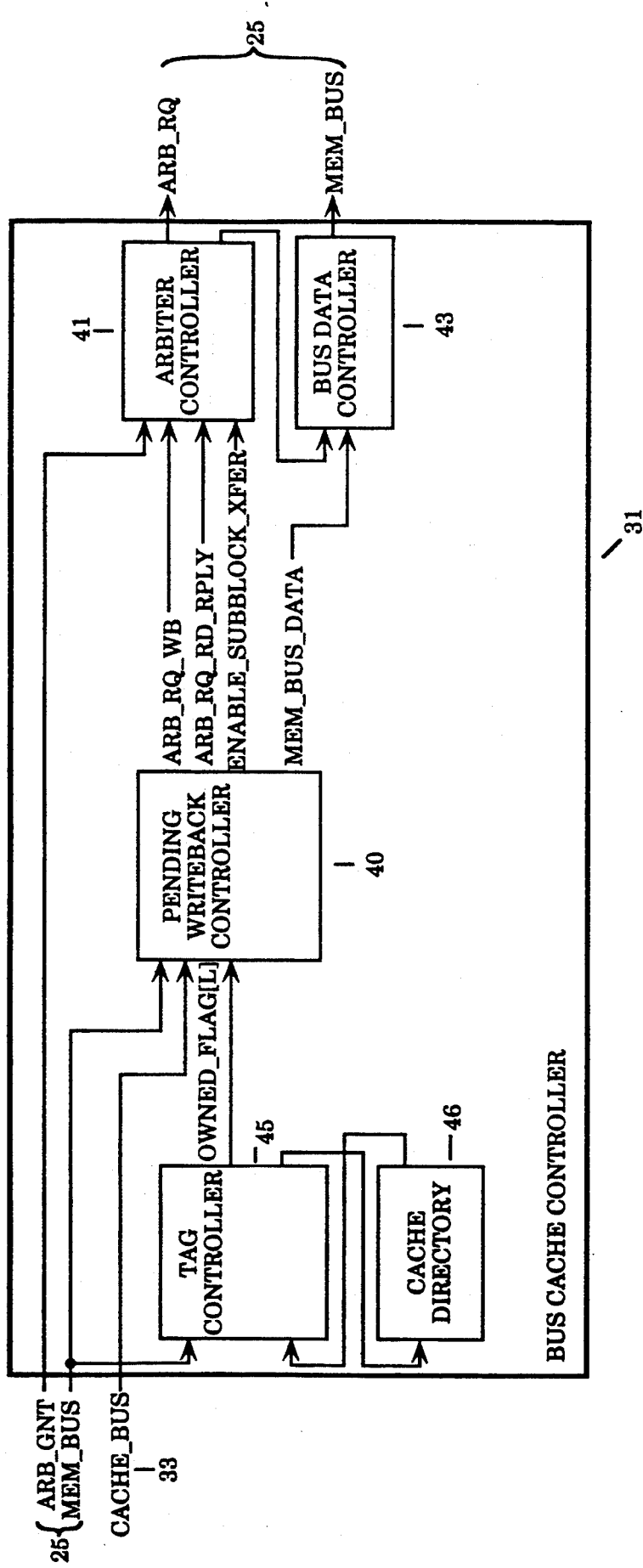
FIG. 4 is a block diagram depicting the internals of the bus cache controller which are related to the pending write-back controller of the present invention.

FIG. 4 illustrates in block diagram form, the internals of the bus cache controller 31 which are used to perform cache line write-backs. Other parts of the bus cache controller 31 have been omitted to avoid confusion. The parts of the bus cache controller 31 used to perform write-backs include an arbiter controller 41, a bus data controller 43, a pending write-back controller 40, and a tag controller 45 with an associated cache directory 46 containing address tags and status bits.

The arbiter controller 41 performs the required memory bus arbitration steps for the pending write-back controller 40. The arbiter controller 41 is used by the pending write-back controller 40 when it needs the memory bus 25 in order to perform a write-back of an owned cache line or to send a read reply packet in response to a read request packet received from another processor subsystem. Methods for performing bus arbitration on a packet-switched bus are provided in the U.S. patent application, Ser. No. 07/621,123, filed Nov. 30, 1990, entitled "Arbitration Of Packet Switched Busses, Including Busses For Shared Memory Multiprocessors" which is hereby incorporated by reference.

The bus data controller 43 performs the "packaging" operations required to send "request" and "reply" packets on the memory bus once the arbiter controller 41 has obtained ownership of the memory bus 25. The pending write-back controller 40 uses the bus data controller 43 to send write-back and read reply packets. Methods and apparatus for sending packets on a packet switched bus are well known in the art and therefore the bus data controller 43 will not be discussed further.

The tag controller 45 controls the bus cache controller directory 46 of address tags and status bits which reflect the state of the cache memory 37. The tag controller 45 provides an owned_flag[L] signal to the pending write-back controller 40. The "[L]" designates a subblock index as will be explained later. The owned_flag[L] is used to transfer ownership of subblocks from the bus cache controller to the pending write-back controller 40.

The pending write-back controller 40 stores the owned cache lines which need to be written back to main memory and controls the write-back operation. The internals of the pending write-back controller 40 will now be explained in detail.

The Pending Write-Back Controller Logic

The control logic in the pending write-back controller is best explained by splitting it into three hierarchical levels. The lowest level is the subblock logic. The subblock logic is the logic that required to control each subblock stored in the pending write-back controller. The next level is the cache line logic. The cache line logic is the logic required to control each cache line in the pending write-back controller. The highest level is the global logic. The global logic uses the information from the two lower levels of logic in its operation.

FIGS. 6, 7a, 7b, 8a, 8b and 9 will be used to explain the pending write-back controller logic in detail. In FIGS. 6, 7a, 7b, 8a, and 8b all the signals on the left side of the page are input signals and all the signals on the right side of the page are output signals. Signals names with an accompanying "(EXTERNAL)" label represent signals that are connected to a higher hierarchical level. Signal names without the "(EXTERNAL)" label represent signals that are connected to a lower higher hierarchical level.

Figure 5:
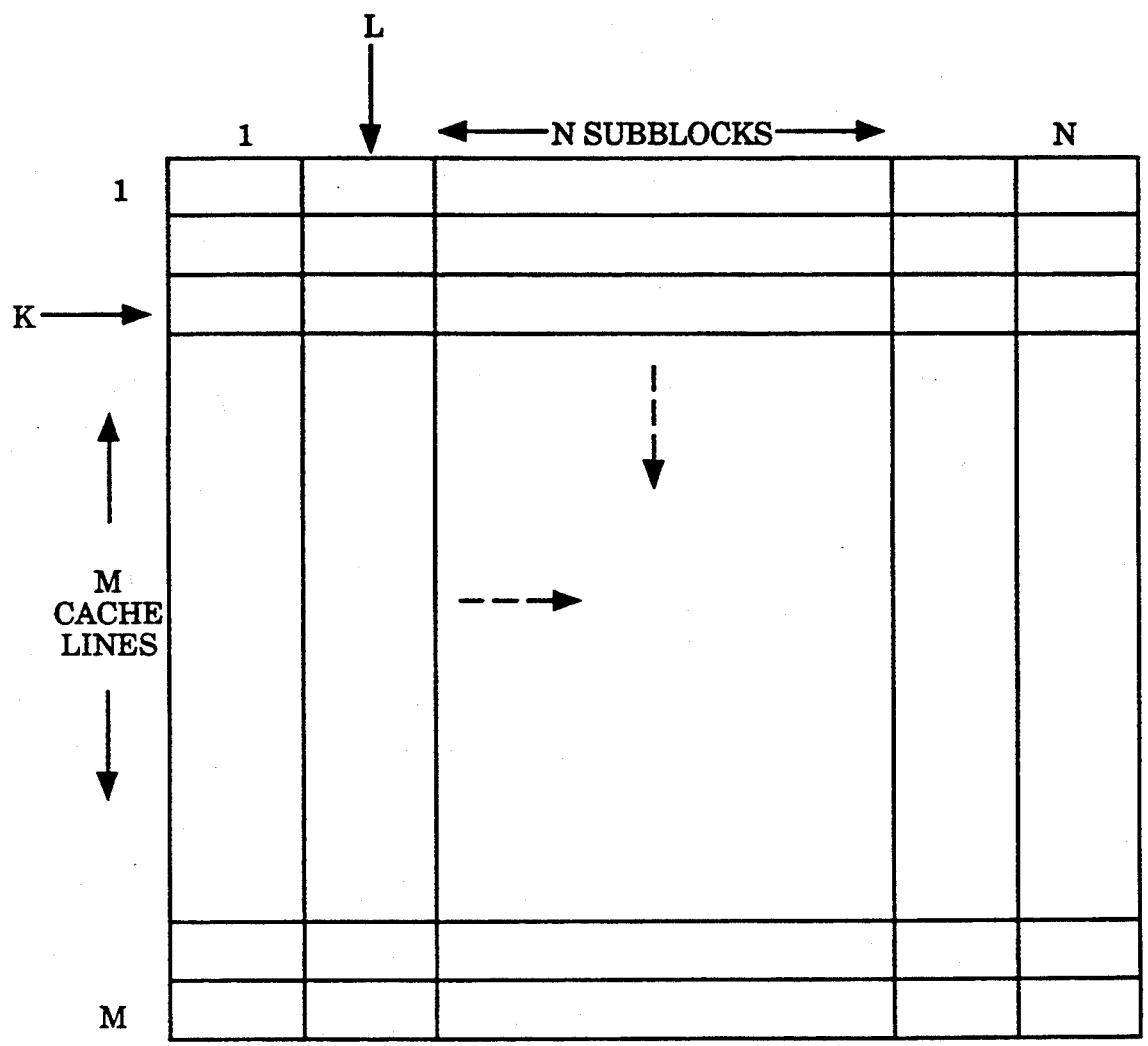
FIG. 5 is a block diagram of the cache memory structure used in the present invention.

FIGS. 6, 7a, 7b, 8a, and 8b explain a pending write-back controller logic in a system with the cache memory depicted in FIG. 5. The cache memory of FIG. 5 contains M cache lines which are indexed from 1 to M using an index K. The cache lines are each split into N subblocks which are indexed from 1 to N using an index L. M and N are generally chosen to be a power of two. In FIGS. 6, 7a, 7b, 8a, and 8b all the signals pertaining to a specific cache line will be given an appended index value [K] and the signals pertaining to a specific subblock will be given an appended index value [L]. Furthermore, I is defined to be $\log_2 M$ or the number of bits needed to represent any number between 1 and M. J is defined to be the number of bits needed for an address tag which uniquely identifies the address of a cache line within the main memory. This number is defined as $J = A - \log_2 N - \log_2 B$, where A is the total number of bits that define the entire memory address space, and B is the number of addressable bytes stored in each subblock[K].

The logic for the pending write-back controller will be explained in detail from a "bottom up" perspective. That is, first the subblock logic for each subblock[L] in the pending write-back controller will be explained with reference to FIG. 6. The cache line logic for each cache line[K] is explained next with reference to FIGS. 7a and 7b. Finally, the global pending write-back controller logic is explained with reference to FIGS. 8a and 8b. The interconnection between the various hierarchical levels of the pending write-back controller logic is illustrated in FIG. 9.

Subblock Logic

Figure 6:
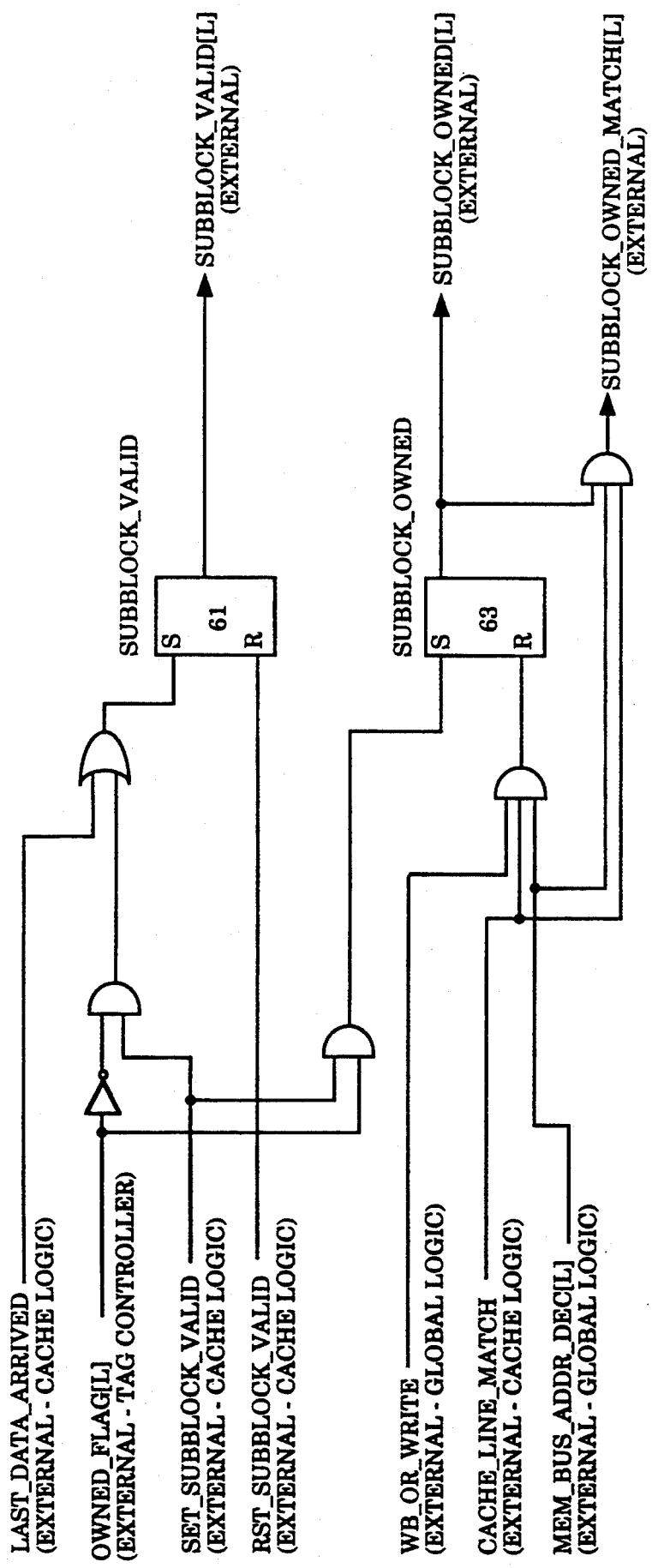
FIG. 6 is an electrical diagram depicting the subblock logic in the pending write-back controller of the present invention.

Referring to FIG. 6, the control logic for an individual subblock is illustrated. Each subblock within the pending write-back controller has two flip-flops 61 and 63 which produce the two signal bits subblock_valid[L] and subblock_owned[L] respectively. These bits reflect the status of the subblocks in the pending write-back controller. Additional logic produces the subblock_owned_match[L] signal.

When the subblock_valid[L] signal bit 61 is asserted, it indicates that the corresponding subblock in the pending write-back controller data RAM either contains the valid data for the subblock, which has been received from the processor cache controller through the cache bus, or that this data is not expected to be sent by the processor cache controller. Therefore, it is set when last_data_arrived is asserted signaling that the processor cache controller has sent the pending write-back controller all the owned subblocks, or when the bus cache controller issues the read request packet (See FIG. 7b) and the corresponding owned bit in the tag directory is not set.

The subblock_valid[L] signal bit 61 is reset when there are no read replies pending to other processors, all the required subblocks have been received by the pending write-back controller from the processor cache controller and written back if they are still owned. The resetting of the subblock_valid[L] signal will be explained in more detail in the description of the cache line logic.

The subblock_owned[L] flip-flop 63 indicates that the corresponding subblock is owned by the pending write-back controller. When a subblock is owned by the pending write-back controller, read replies must be sent to other processor subsystems requesting this subblock and the subblock must be written back to main memory before the subblock_owned[L] flip-flop can be cleared. The subblock_owned[L] bit 63 is set when the bus cache controller issues a read request packet on the memory bus and the corresponding "owned" status bit in the bus cache control directory 46 (See FIG. 3a) is set as indicated by the owned_flag[L]. This in effect transfers "ownership" of the subblock from the bus cache controller directory 46 to the pending write-back controller.

The subblock_owned[L] bit 63 is reset when the write-back to main memory is performed by the pending write-back controller or another processor writes to the subblock before the write-back takes place, thereby signaling that the data for this subblock in the pending write-back controller is stale. The signal resetting the subblock_owned[L] bit 63 is formed by the logical AND of a signal that detects a write on the memory bus (wb_or_write), a signal that detects a cache line match (cache_line_match), and a signal that detects a subblock match (mem_bus_addr_dec[L]).

The subblock_owned_match[L] signal indicates that the current subblock on the memory bus matches this particular subblock and that the subblock is owned by the pending write-back controller. This signal is used by the next two higher levels of pending write-back controller logic. The subblock_owned_match[L] signal is produced by the logical AND of the cache_line_match signal (which signals that the address on the memory bus matches the address of this cache line), the mem_bus_addr_dec[L] signal (which signals that the subblock on the memory bus matches this subblock), and the subblock_owned signal[L].

Cache Line Logic

Figure 7A:
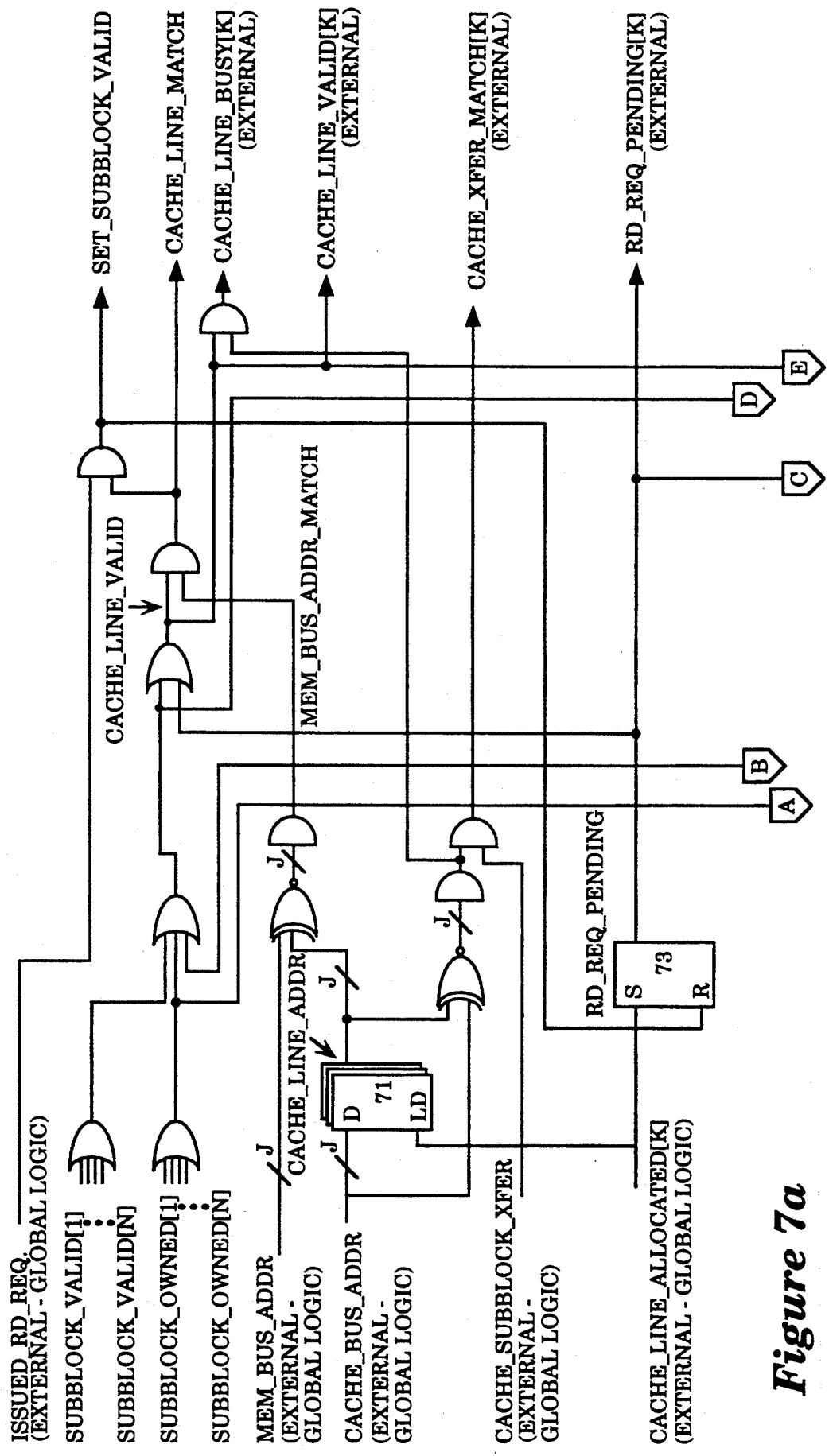
FIG. 7a is a first electrical diagram depicting the cache line logic in the pending write-back controller of the present invention.
Figure 7B:
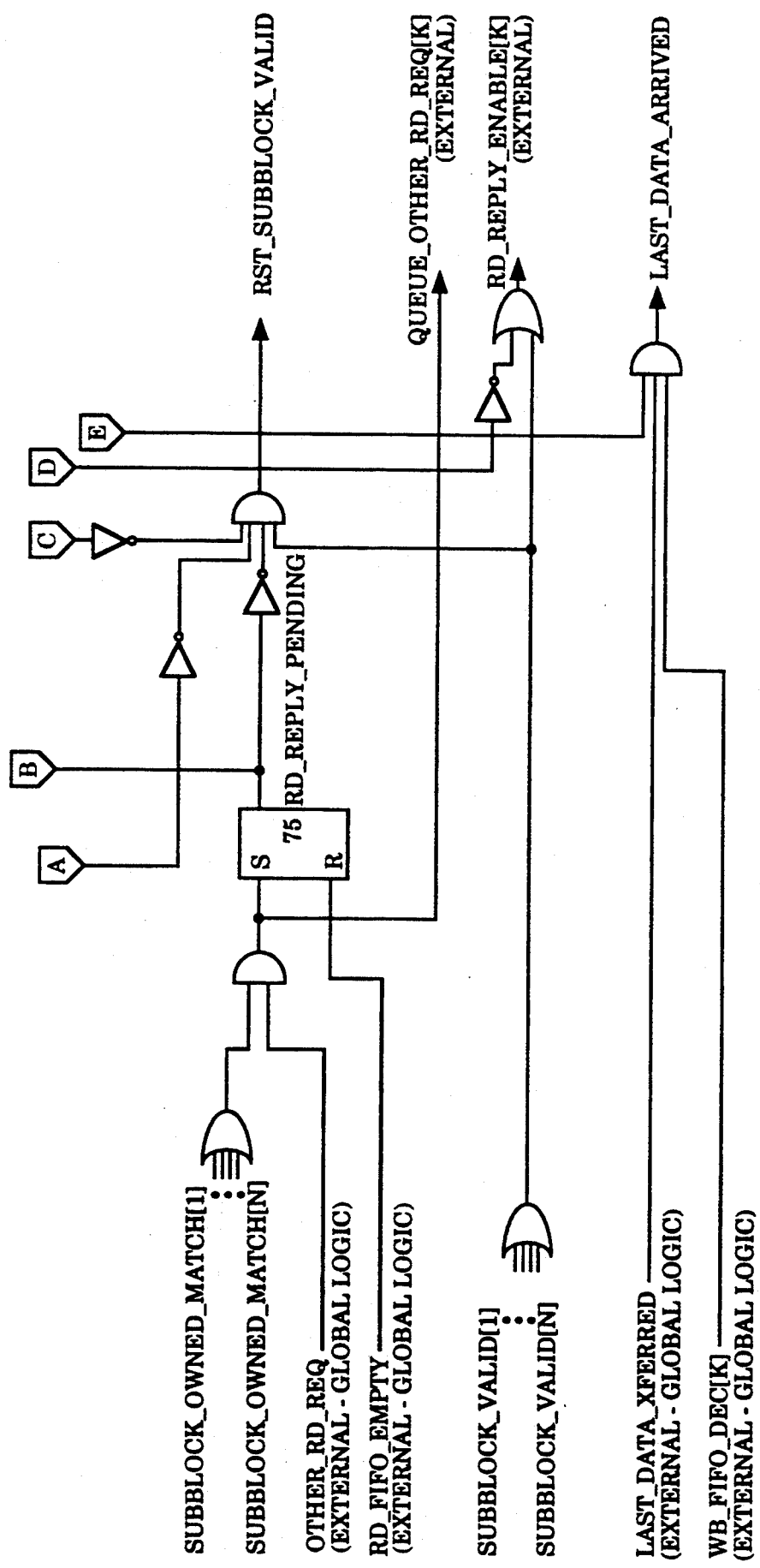
FIG. 7b is a second electrical diagram depicting the cache line logic in the pending write-back controller of the present invention.

Referring to FIGS. 7a and 7b, the control logic for an individual cache line is illustrated. The subblock_valid[1−N], subblock_owned[1−N], and subblock_owned_match[1−N] signals described in the previous section are input signals from the subblock logic units associated with this particular cache line.

The cache_line_valid signal is asserted from the time that the processor cache controller issues a read request until the time that all the necessary subblocks have been written back to main memory and no more read replies need to be issued to other requesting processors. This signal is produced by a logical OR of the cache line's associated subblock_valid[1−N], subblock_owned[1−N], rd_req_pending, and rd_reply_pending bits.

The rd_req_pending signal bit 73 is set when the processor cache controller issues a read request to the bus cache controller. This signal indicates that the processor cache controller has requested a new cache line, but the bus cache controller has not sent out a corresponding read request on the memory bus. The rd_req_pending signal bit 73 is reset when the bus cache controller broadcasts the corresponding read request on the memory bus. At that time the set_subblock_valid signal is asserted to transfer ownership of the owned subblocks from the bus cache controller to the pending write-back controller. The subblocks not owned by the bus cache controller have the corresponding subblock_valid[L] signal bits set high.

The rd_reply_pending signal bit 75 is set whenever another processor in the system issues a read request for a subblock owned by the pending write-back controller. The rd_reply_pending signal bit 75 indicates that the pending write-back controller needs to send one or more read reply packets containing the owned subblocks back to the appropriate requesting processor subsystems before the cache line can be purged. The rd_reply_pending signal bit 75 is set by a logical AND of the other_rd_req signal and a signal indicating an address match between the memory bus and a subblock in this cache line. The signal used to set the rd_reply_pending signal bit 75 is also used to inform the pending write-back global logic by generating a queue_other_rd_req[K] signal to queue the read request onto a FIFO queue storing a list of read replies that must be sent out.

The rd_reply_pending bit 75 is reset when all the read requests from other processors have been serviced by sending an appropriate reply packets. The reset is performed by a signal indicating that the FIFO queue storing the list of read replies that must be sent out is empty.

The cache_line_addr flip-flops 71 store the current address of the associated cache line. The mem_bus_addr_match signal is asserted if the address for the command on the memory bus matches the address stored in the cache_line_addr flip-flops 71.

The cache_line_busy[K] signal is similar to the cache_line_valid signal, except that it will only be asserted if the processor cache controller sends a packet across the cache bus with the same address as that stored in the cache_line_addr flip-flops 71. This allows the processor cache controller to send multiple outstanding read requests to the same cache line, as could be implemented for pre-fetching additional data within the cache line.

The cache_subblock_xfer line is asserted for each subblock that the processor cache controller sends to the pending write-back controller. Since the cache_subblock_xfer signal is logically ANDed with a signal with indicates an address match between the current cache_bus_addr and each cache_line_addr, at most one cache_xfer_match[K] signal will be asserted for each owned subblock that the processor cache controller sends to the pending write-back controller. The cache_xfer_match[K] signal is used by the pending write-back controller global controller to load a write-back request onto a FIFO queue storing pending subblock write-backs.

The rst_subblock_valid signal is asserted when all of the subblock_valid[L] bits for the cache line are set, there is no rd_req_pending, for the cache line, there is no rd_reply_pending, for the cache line, and none of the subblocks are owned (as indicated by a logical NOR of all the subblock_owned[L] bits). This indicates that all the required subblocks have been received by the pending write-back controller, written back to main memory if needed, and no more read replies need be issued to other requesting processor subsystems. The rst_subblock_valid signal will cause all the associated subblock_valid[L] bits for the cache line to be reset, and thereby resetting the cache_line_valid signal. This signals that the pending write-back controller has fulfilled its responsibility of writing back the owned subblocks of the cache line.

The queue_other_rd_req[K] line indicates when another processor has requested an owned subblock from this cache line in the pending write-back controller. The queue_other_rd_req[K] line is asserted if any one of the subblock_owned_match[L] bits indicates an address match with the packet on the memory bus and the other_rd_req signal indicates the packet on the memory bus is a read request from another processor subsystem. The queue_other_rd_req signal will cause a read request to be queued onto a FIFO queue in the global logic storing a list of read replies that must be sent out.

The rd_rply_enable[K] signal for the cache line is asserted if either all the required owned subblocks have been issued by the processor cache, or this cache line controller is not being used. This signal is used by the global logic to determine if the arbiter controller should attempt to get access to the memory bus.

The last_data_arrived signal indicates when the last cycle transferring an owned subblock from the processor cache controller to the pending write-back controller has occurred. This signal is the logical AND of cache_line_valid, last_data_xferred, and wb_fifo_dec[K].

Global Pending Write-Back Controller Logic

Figure 8A:
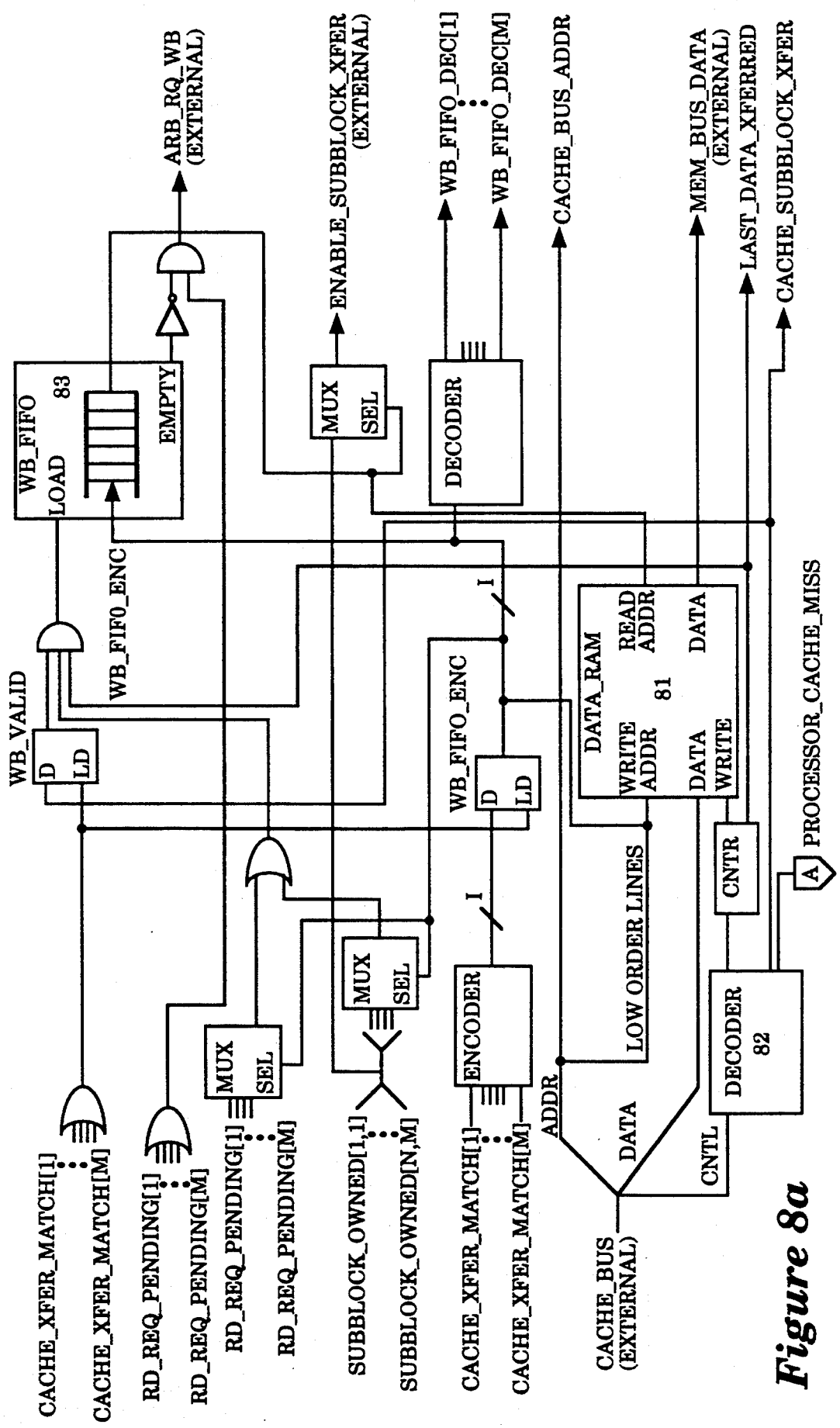
FIG. 8a is a first electrical diagram depicting the global pending write-back controller logic in the present invention.
Figure 8B:
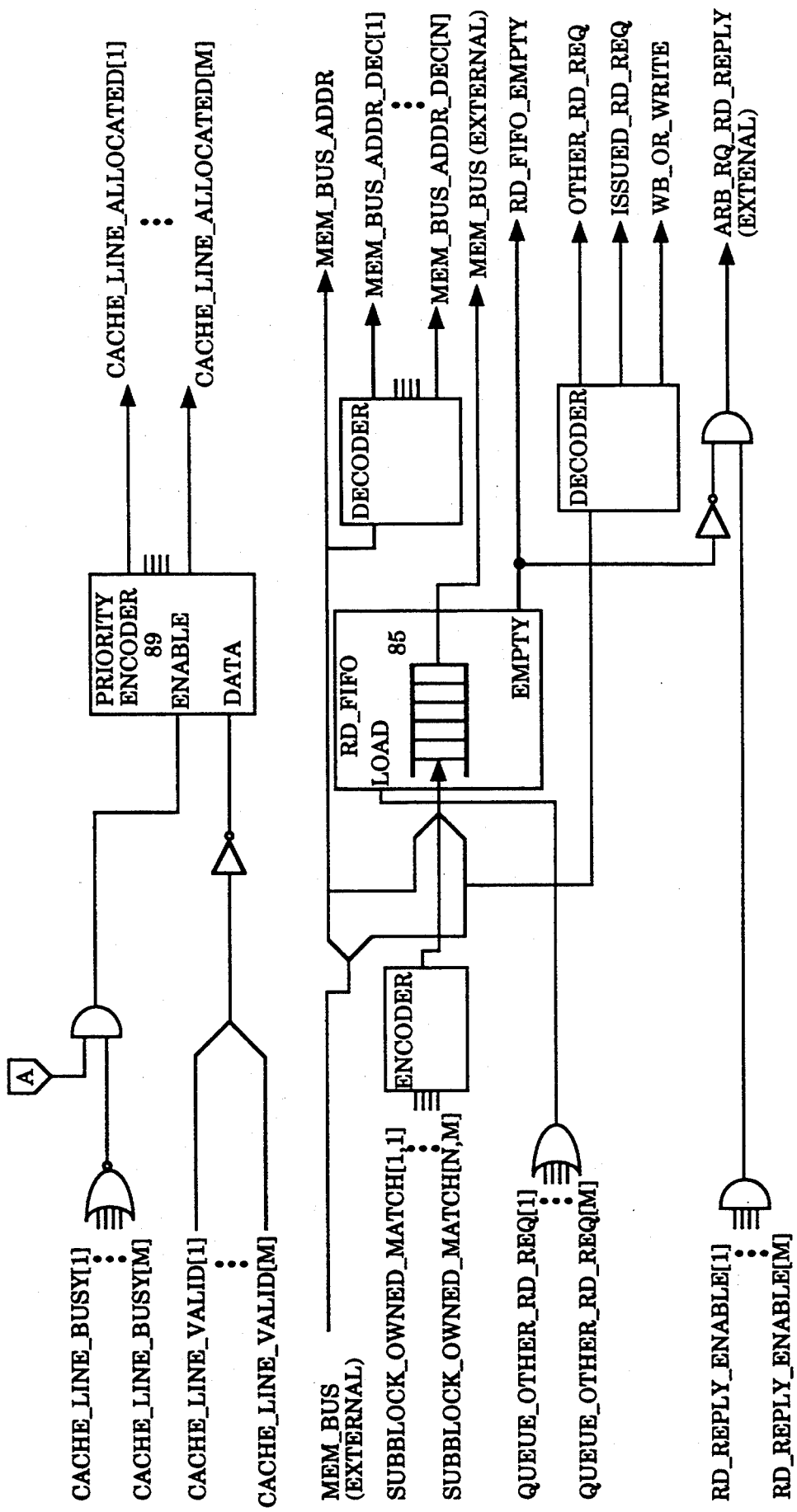
FIG. 8b is a second electrical diagram depicting the global pending write-back controller logic in the present invention.
Figure 9:
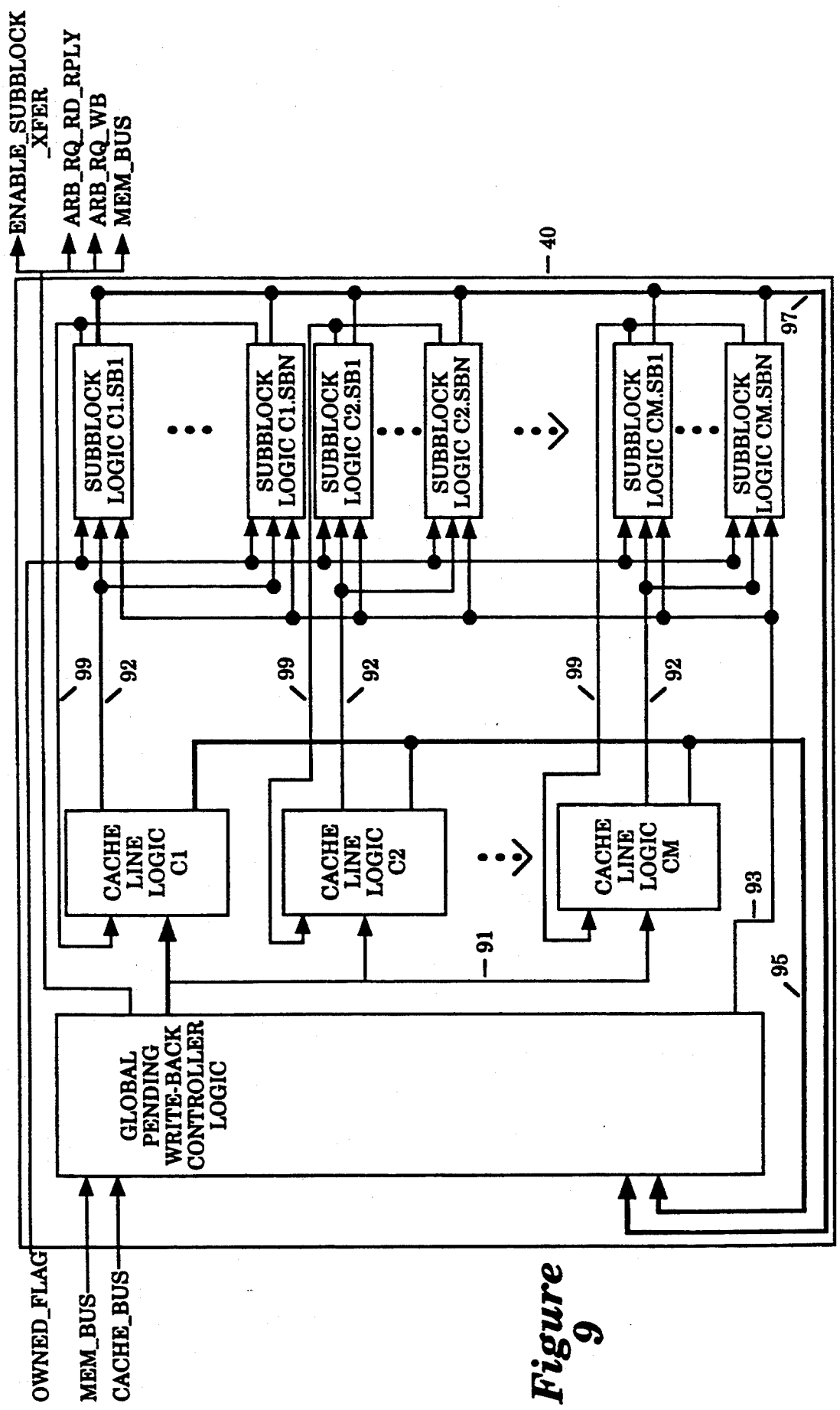
FIG. 9 is a block diagram illustrating the interconnections between the various hierarchical logic levels of the pending write-back controller of the present invention.

FIGS. 8a and 8b illustrate the global pending write-back controller logic. When the processor cache controller issues a read request, the decoder 82 will decode the read request control information and allocate a cache line by examining the cache lines that are not busy using a priority encoder 89. This will cause one of the cache_line_allocated[K] signals to be asserted which loads the address into the cache_line_addr flip-flips 71 of the chosen cache line controller.

The data_ram 81 stores the data for all the subblocks owned by the pending write-back controller. The address for writing data into the data_ram 81 is formed by concatenating the $\log_2 N$ low order address bits that specify the subblock, and the I address bits which specify the cache line which contains the address for the data. The owned subblocks stored into the data_ram 81 are eventually written back to main memory across the memory bus provided that the data has not become stale.

The wb_fifo 83 contains an encoded list of the subblocks in the data_ram 81 that need to be written back to main memory. These subblocks cannot be sent to main memory until all the rd_req_pending[1−M] signals are de-asserted, indicating that the read request has been issued by the bus cache controller and ownership of the subblocks is transferred to the pending write-back controller. Once the subblocks are ready to be transferred to the memory bus, the appropriate subblock_owned[L] bit must be checked again to ensure that it is still set. If a write request by another processor to a particular subblock has occurred, its subblock_owned[L] bit will not be set. If subblock_owned[L] bit is not set then the subblock must not be written to main memory since the subblock is stale. A similar check may be performed before requesting access to the memory bus, however the details of the memory bus arbitration logic are beyond the scope of this patent.

The rd_fifo 85 contains an encoded list of the read requests issued by other processor subsystems to the subblocks owned by the pending write-back controller. The pending write-back controller does not reply to the pending read requests in the rd_fifo 85 until all the owned subblocks which will be replaced have been sent from the processor cache controller. The pending write-back controller must respond to all the read requests in the rd_fifo 85 before the subblocks in the pending write-back controller can be invalidated.

The data_ram 81, wb_fifo 83, and rd_fifo 85 need not be implemented as single RAMs or FIFOs. Each may be implemented with as many RAMs and FIFOs as there are cache lines. This approach removes the dependency on all the cache lines for emptying the wb_fifo 83 and the rd_fifo. 85 For example, if a single RAM is used to implement the rd_fifo 85, the cache line corresponding to the read request at the top of the queue may not have received the data from the processor cache controller yet. This would prevent other read requests in the rd_fifo 85 requesting information from other cache lines from proceeding, even if the data is available in the data_ram 81.

Pending Write-Back Controller Logic Connections

The interconnections between the various hierarchical levels of logic depicted in FIGS. 6, 7a, 7b, 8a, and 8b is illustrated in FIG. 9. The single global pending write-back controller logic unit will hereinafter be referred to as the global logic. Each cache line logic unit is given a label Cx where x is a value from 1 to M corresponding to the cache line. Each subblock logic unit is given a label Cx.SBy where x is a value from 1 to M corresponding to the cache line and y is a value from 1 to N corresponding to the subblock. In FIG. 9 three cache line logic units are depicted with two subblock logic units for each cache line logic unit. Therefore, the system depicted in FIG. 9 is a complete system where there are 3 cache lines (M=3), each of which has 2 subblocks (N=2). In the presently preferred embodiment the cache memory has 2 cache lines (M=2) which have 4 subblocks each (N=4).

The global pending write-back controller logic has two external inputs and four external outputs. The two external inputs consists of the cache bus from the processor cache controller and the memory bus. The external outputs are the enable_subblock_xfer, arb_rq_rd_reply, arb_rq_wb signals and the memory bus. The arb_rq_rd_reply and arb_rq_wb signals are used for memory bus arbitration.

The global logic also has several internal inputs and outputs which connect to the cache line logic units and the subblock logic units. Global logic output lines 91 carry the signals issued_rd_req, mem_bus_addr, cache_bus_addr, cache_subblock_xfer, other_rd_req, and rd_fifo_empty to every cache line logic unit C1–CM. Global logic output lines 91 also carry the appropriate cache_line_allocated[K] and wb_fifo_dec[K] signals to each cache logic unit CK where K is from 1 to M. Global logic output lines 93 carry signals to all the subblock logic units. Global logic output lines 93 carry the wb or write signal to every subblock logic unit and the appropriate mem_bus_addr_dec[L] signal to each subblock logic Cx.SBL. Global logic input lines 95 carry the signals cache_line_busy[K], cache_tine_valid[K], cache xfer_match[K], rd_req_pending[K], last_data_xfer, queue_other_rd_req[K], and rd_rply_enable[K] from each cache line logic CK where K is from 1 to M. Global logic input lines 97 carry the signals subblock_owned[K,L] and subblock_owned_match[K,L] from every subblock logic unit CK.SBL where K is from 1 to M and L is from 1 to N.

The cache line logic units to the right of the global logic receive input from the global logic and the associated subblocks. Each cache line logic CK receives the global logic output lines 91 described above as input. Each cache line logic CK also receives the signals subblock_valid[[1−N], subblock_owned[[1−N], and subblock_owned_match[[1−N] from the associated subblocks L over the subblock output lines 99. The cache line logic units output the global logic input lines 95 described above. Each cache line logic unit also outputs the signals set_subblock_valid, rst_subblock_valid, last_data_arrived, and cache_line_match on cache line output lines 92 to each associated subblock logic unit.

The subblock logic units receive input from the associated cache line logic unit, the global logic, and the tag controller. The subblock logic units each receive the global logic output lines 93 from global logic and the cache line output lines 92 from the associated cache line logic. Each subblock logic unit also receives the input owned_flag[L] from the tag controller in the bus cache controller. This signal is used to transfer ownership from the bus cache controller to the pending write-back controller. Each subblock logic unit outputs the global logic input lines 97 and the subblock to cache line signals described above.

The foregoing has described apparatus and methods for implementing a dual directory cache control system having a pending write-back cache controller in multiprocessor system. It is contemplated that changes and modifications may be made by one of ordinary skill in the art, to the device components and arrangements of elements of the present invention without departing from the spirit and scope of the invention. For example, although the pending write-back controller has been described operating in a cache control system that has been divided into two separate units, the bus cache controller and the processor cache controller, the pending-write-back controller could be used in any write-back cache control system that uses a packet switching memory bus.

We claim:

1. A computer system including a first processor subsystem and a main memory, said first processor subsystem and main memory coupled via a packet-switched memory bus, said first processor subsystem having a write-back cache memory system, said write-back cache memory system comprising:

a cache memory, said cache memory comprising more than one cache line, each of said cache lines storing information;

a cache directory, said cache directory describing said information stored in said cache memory, said cache directory comprising an address tag and a plurality of status bits for each cache line in said cache memory, said plurality of status bits including a valid bit and an owned bit;

a cache control system, said cache control system coupled to said cache memory and said cache directory, said cache control system further coupled to said packet-switched memory bus, said cache control system maintaining said cache directory;

a pending write-back controller, said pending write-back controller coupled to said cache control system, said pending write-back controller comprising;

a data memory for buffering a plurality of owned cache lines, each of said owned cache lines having a corresponding main memory address;

a write-back address tag and a plurality of status bits for each of said plurality of owned cache lines stored in the data memory, said write-back address tag defining a main memory address of said owned cache line;

a write-back memory, said write-back memory storing an encoded list of owned cache lines stored in said data memory which must be written back to said main memory; and a pending write-back control logic unit for controlling said pending write-back controller such that each owned cache line listed in said encoded list in said write-back memory is written back to said main memory after each owned cache line is replaced.

2. The computer system including write-back cache memory system as claimed in claim 1 wherein said pending write-back controller further comprises:

a read request memory, said read request memory storing a list of read requests received from a second processor subsystem coupled to said packet-switched memory bus, said read requests requesting the owned cache lines in said data memory; and said pending write-back control logic unit sending a read request reply to said second processor subsystem for each read request stored in said read request memory.

3. The write-back cache memory system as claimed in claim 2 wherein said plurality of status bits in said pending write-back controller comprise a valid bit and an owned bit.

4. The write-back cache memory system as claimed in claim 3 wherein said pending write-back control logic unit further comprises means for resetting the owned status bit for an owned cache line stored in said data memory when a write transaction occurs on said packet-switched memory bus to the corresponding main memory address of the owned cache line such that said pending write-back controller does not write-back said owned cache line.

5. The write-back cache memory system as claimed in claim 4 wherein said write-back memory in said pending write-back control logic unit comprises a first-in-first-out (FIFO) memory.

6. The write-back cache memory system as claimed in claim 5 wherein said read request memory in said pending write-back control logic unit comprises a first-in-first-out (FIFO) memory.

7. The write-back cache memory system as claimed in claim 6 wherein said cache control system comprises:
a bus cache controller, said bus cache controller interfacing said cache control system to the packet-switched memory bus, said bus cache controller having a first cache directory;
a processor cache controller, said processor cache controller interfacing said cache memory to a first processor in said first processor subsystem, said processor cache controller having a second cache directory; and
a packet-switched cache bus, said packet-switched cache bus coupling said bus cache controller and said processor cache controller.

8. The write-back cache memory system as claimed in claim 7 wherein each of said cache lines are further subdivided into M subblocks, each of said subblocks having separate status bits, each of said subblocks of said cache lines handled as individual memory blocks.

9. In a computer system including first processor subsystem and a main memory, said first processor subsystem and main memory coupled via a packet-switched memory bus, a write-back cache memory system in said first processor subsystem, said write-back cache memory system comprising:
a cache memory, said cache memory comprising more than one cache line, each of said cache lines storing lines of information, each of said lines of information having a corresponding main memory address;
a cache directory, said cache directory storing an address tag and a set of status bits for each cache line in said cache memory, said address tag being the corresponding main memory address for said cache line;
a write-back cache control system, said write-back cache control system maintaining said cache memory and said cache directory;
means for requesting a new line of information for a cache line storing an owned line in said cache memory over said packet-switched memory bus;
means for copying the owned line of information from the cache line in the cache memory to a pending write-back controller, said pending write-back controller comprising
means for buffering said owned line of information from said cache memory;
means for storing a write-back address tag and a plurality of status bits for said owned line of information, said write-back address tag being the corresponding main memory address of said owned line of information;
means for writing back said owned line of information to said main memory when no read requests for said owned line of information are pending;
means for replacing said owned line of information with said requested new line of information in the cache line of the cache memory; and
means for writing back said owned line of information in the pending write-back controller to said main memory.

10. The write-back cache memory system as claimed in claim 9 wherein said pending write-back controller further comprises:
means for receiving and storing at least one read request from a second processor subsystem, said read request requesting the owned line of information;
means for replying to said read request from said second processor subsystem with a read request reply to said second processor subsystem, said read request reply containing said owned line of information.

11. The write-back cache memory system as claimed in claim 10 wherein said plurality of status bits in said pending write-back controller comprise a valid bit and an owned bit.

12. The write-back cache memory system as claimed in claim 11 wherein said pending write-back controller further comprises:
means for receiving a plurality of write requests, said write requests writing to the main memory address of the owned line of information;
means for responding to said write requests by resetting the owned bit of the owned line of information such that said owned line of information is not written back to main memory.

13. The write-back cache memory system as claimed in claim 12 wherein each of said cache lines are further subdivided into M subblocks, each of said subblocks of said cache lines handled as individual memory blocks.

14. A method for a computer system including a first processor subsystem and a main memory coupled via a packet-switched memory bus, said first processor subsystem having a write-back cache memory system comprising a cache memory having more than one cache line, a method of replacing the cache lines in the first processor subsystem cache memory, said method for computer system comprising the steps of:
requesting a new line of information for a first cache line in said first processor subsystem cache memory over said packet-switched memory bus;
transferring an owned line of information from the first cache line of said processor subsystem cache memory to a pending write-back controller, said pending write-back controller buffering said owned line of information;
receiving said requested new line of information into the first cache line of said first processor subsystem cache memory;

writing back said owned line of information buffered in the pending write-back controller to the main memory, said step of writing back said owned line of information occurring after said step of requesting said new line of information.

15. The method for computer system including method of replacing the cache lines in the first processor subsystem cache memory as claimed in claim 14 wherein said step of writing back said owned line of information in the pending write-back controller further comprises:

receiving read requests for the owned line of information from a second processor subsystem coupled to said packet-switched memory bus; and responding to said read requests for the owned line of information from said second processor subsystem by sending a read request reply to said second processor subsystem, said read request reply containing the owned line of information.

16. The method of replacing the cache lines in the first processor subsystem cache memory as claimed in claim 15 wherein said step of writing back said owned line of information in the pending write-back controller further comprises:

receiving write requests to the owned line of information from a second processor subsystem coupled to said packet-switched memory bus; and responding to said write requests to the owned line of information from said second processor subsystem by not writing back said owned line of information to the main memory.

17. The method of replacing the cache lines in the first processor subsystem cache memory as claimed in claim 16 wherein each of said cache lines are further subdivided into M subblocks, each of said subblocks of said cache lines handled as individual memory blocks.

* * * * *

UNITED STATES PATENT AND TRADEMARK OFFICE
CERTIFICATE OF CORRECTION

PATENT NO. : 5,434,993
DATED : July 18, 1995
INVENTOR(S) : Liencres et al.

It is certified that error appears in the above-identified patent and that said Letters Patent is hereby corrected as shown below:

In columns 17-18, claims 3-8 and 10-13 in the first sentence of each claim, please delete " The write-back " and insert -- The computer system including write-back --.

In column 17, claim 9 at line 45, please delete " In a " and insert -- A --.

In column 17, claim 9 at line 45, please delete " including first " and insert -- including a first --.

In column 20, claims 16-17 in the first sentence of each claim, please delete " The method " and insert -- The method for computer system including method --.

Signed and Sealed this

Eighteenth Day of May, 1999

Attest:

Q. TODD DICKINSON

*Attesting Officer*         *Acting Commissioner of Patents and Trademarks*